Patented Mar. 6, 1928.

1,661,233

UNITED STATES PATENT OFFICE.

JOHN REICHEL, OF PHILADELPHIA, PENNSYLVANIA.

PRODUCT KILLED HOG CHOLERA VIRUS AND PROCESS OF PRODUCING IT.

No Drawing.   Application filed February 16, 1925.   Serial No. 9,706.

The invention relates to a new and useful product killed hog cholera virus, and process for producing it, which product can be used alone or with anti-hog-cholera serum as an immunizing agent without the element of danger or risk of causing the disease of hog cholera in susceptible hogs.

In carrying out the process, the cause of hog cholera in whatever available form, or live virulent hog cholera virus, in the form of virulent blood from a hog infected or sick of hog cholera, or live virulent virus contained in the blood plasma, serum, or defibrinated blood therefrom or an artificial culture or dilution of the cause of hog cholera, is subjected to a chemical or physical treatment or condition or both chemical and physical treatment to kill off the virulence, or infectivity, of the virus, without making the resultant product containing the killed virus unfit for use as an immunizing agent when injected in sufficient doses as described hereinafter.

Living hog cholera virus in a highly virulent form has been used for many years in the simultaneous treatment with anti-hog cholera serum in the immunization of hogs, and living hog cholera virus has been experimented with with a view of attenuating its virulence, or infectivity; but no effort has as yet been made to kill hog cholera virus with the view or object of determining or establishing its immunizing value in sufficient doses as described hereinafter and which may be injected in sufficient doses as described herein simultaneously with anti-hog cholera serum or without said serum.

My process, as hereinafter disclosed, is preferably carried out by taking a definite amount of live virulent hog cholera virus in the form of defibrinated blood, and adding thereto a preservative, for instance, such as 0.5% phenol, and placing the mixture in a refrigerator at a temperature of from 5° to 10° C. for a period sufficiently long to check all bacterial growth, say, approximately from thirty to ninety days, and then subjecting the mixture to a higher temperature than 5° to 10° C., preferably however a temperature that is not so high as will cause physical changes to occur therein that would detract from the usefulness of the product. An exposure of the mixture to 37° C. or thereabouts for a period actually to kill off all bacterial contamination, of approximately thirty days will also kill the hog cholera virus, thus making it non-virulent, or non-infective, when injected into susceptible hogs in sufficient doses of from 5 cc. to 50 cc. for each fifty pounds or fraction thereof of hog. The injection of the killed virus in the sufficient dosage as above described into susceptible hogs regardless of their sizes will be unaccompanied by the development of hog cholera in the hogs injected, and the same hogs will be subsequently found to be immune to any natural infection of hog cholera, or injection of live virulent hog cholera virus; provided the injections were in sufficient dosages as described above and sufficient time has been granted to permit the hogs injected with the killed hog cholera virus in sufficient dosage as above given to react to the injection and develop the increased resistance or immunity. It has been demonstrated that hogs injected with the above described killed virus product in sufficient dosage as described above and held six weeks will withstand a subsequent injection of 2 cc. living virulent hog cholera virus, thereby proving that only killed hog cholera virus was originally injected.

Having disclosed a practical way of killing live, virulent hog cholera virus by chemical or physical means as above described and producing the product, killed hog cholera virus, and having demonstrated by injection in sufficient dosage as described above and test of my killed hog cholera virus product that I obtain by my process as described herein and its immunizing value can be relied upon when injected in sufficient dosage as described above and properly used,

What I claim and desire to protect by Letters Patent is:

1. The process of obtaining killed hog cholera virus from live virulent hog cholera virus consisting in adding a preservative to live virulent hog cholera virus, and subjecting the mixture to a temperature of from 5° to 10° C. for a period only long enough to check bacterial growth, and then exposing it to a temperature of about 37° C. for a period only long enough to kill all bacterial contamination and the hog cholera virus.

2. The process of obtaining killed hog cholera virus, consisting in adding to a definite quantity of live virulent hog cholera virus in the form of defibrinated blood 0.5% phenol, and subjecting the mixture to a temperature of from 5° to 10° C. for from thirty to ninety days, sufficient to check bacterial growth, and then a temperature of about 37° C. for about thirty days, to kill all bacterial contamination and the hog cholera virus.

3. Killed hog cholera virus, dissociated from live virulent hog cholera virus, as a non-infective and immunizing agent against hog cholera when injected into susceptible hogs in doses of from 5 cc. to 50 cc. for each fifty pounds or fraction thereof per hog, and made from live virulent hog cholera virus mixed with a preservative and subjected to temperatures of from 5° to 10° C. for from thirty to ninety days and thereafter to a temperature of about 37° C. for a period of about thirty days.

Signed at Philadelphia in the county of Philadelphia and State of Pennsylvania this 4th day of February A. D. 1925.

JOHN REICHEL.